United States Patent
Weiers

(10) Patent No.: US 11,211,066 B2
(45) Date of Patent: Dec. 28, 2021

(54) HAZARD DETECTION WITH SPEECH PROCESSING INSTALLED IN A PERMANENT LOCATION IN A BUILDING

(71) Applicant: Siemens Schweiz AG, Zürich (CH)

(72) Inventor: Tilman Weiers, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 112 days.

(21) Appl. No.: 16/266,314

(22) Filed: Feb. 4, 2019

(65) Prior Publication Data
US 2019/0244614 A1 Aug. 8, 2019

(30) Foreign Application Priority Data

Feb. 5, 2018 (DE) .................... 10 2018 201 702.6

(51) Int. Cl.
*G10L 15/22* (2006.01)
*H04N 7/18* (2006.01)
(Continued)

(52) U.S. Cl.
CPC .............. *G10L 15/22* (2013.01); *G08B 7/066* (2013.01); *G08B 17/00* (2013.01); *G08B 17/10* (2013.01); *G08B 21/02* (2013.01); *G08B 21/12* (2013.01); *G08C 17/00* (2013.01); *G08C 19/00* (2013.01); *G10L 25/51* (2013.01); *G10L 2015/088* (2013.01)

(58) Field of Classification Search
CPC .. H04N 7/186; G07D 7/0034; G08B 21/0211; G08B 21/0222; G08B 29/20; H04B 7/2621; G10L 15/22

USPC ........ 348/158; 382/232; 340/539.13, 539.11; 370/329

See application file for complete search history.

(56) References Cited

U.S. PATENT DOCUMENTS 4,914,651 A * 4/1990 Lusignan ............. H04B 7/2621
370/329
5,832,119 A * 11/1998 Rhoads ................ G07D 7/0034
382/232

(Continued)

FOREIGN PATENT DOCUMENTS

EP          3 147 879 A1     3/2017    ............. G08B 17/00
WO        2005/050959 A2     6/2005    ............. G06F 17/21

*Primary Examiner* — Farzad Kazeminezhad
(74) *Attorney, Agent, or Firm* — Slayden Grubert Beard PLLC

(57) ABSTRACT

Various embodiments include a hazard detector comprising: a microphone configured to record an audio signal; a hazard sensor; a detection circuit connected to the hazard sensor; and a processing unit connected to the detection circuit and the microphone. The detection circuit receives signals from the hazard sensor and generates a signal as a function thereof. The processing unit comprises a digital interface for communication with an external computer and is configured: to receive the detector signal from the detection circuit; to receive the audio signal from the microphone and to detect a predetermined preamble comprising a word in the audio signal; and if the detector signal contains a positive indication with respect to a hazard or if a predetermined preamble is detected in the audio signal, to generate a output signal as a function of the received signal and send the output signal to the computer via the interface.

10 Claims, 2 Drawing Sheets

(51) Int. Cl.
*G07D 7/00* (2016.01)
*G08B 21/02* (2006.01)
*H04B 7/26* (2006.01)
*G08C 19/00* (2006.01)
*G08B 7/06* (2006.01)
*G08B 17/10* (2006.01)
*G08C 17/00* (2006.01)
*G08B 17/00* (2006.01)
*G08B 21/12* (2006.01)
*G10L 25/51* (2013.01)
*G10L 15/08* (2006.01)

(56) References Cited

U.S. PATENT DOCUMENTS

| | | | |
|---|---|---|---|
| 6,028,514 A * | 2/2000 | Lemelson | G08B 21/0211 340/539.13 |
| 7,109,859 B2 * | 9/2006 | Peeters | G08B 21/0222 340/539.11 |
| 9,812,001 B1 * | 11/2017 | Grant | G08B 29/20 |
| 2013/0057696 A1 * | 3/2013 | Felt | H04N 7/186 348/158 |
| 2018/0018866 A1 | 1/2018 | Carlin et al. | |

* cited by examiner

1

HAZARD DETECTION WITH SPEECH PROCESSING INSTALLED IN A PERMANENT LOCATION IN A BUILDING

CROSS-REFERENCE TO RELATED APPLICATIONS

This application claims priority to DE Application No. 10 2018 201 702.6 filed Feb. 5, 2018, the contents of which are hereby incorporated by reference in their entirety.

TECHNICAL FIELD

The present disclosure relates to hazard detection. Various embodiments may include an apparatus and/or a system for hazard detection in a building wherein speech recognition and speech processing enable a user to issue verbal requests for instructions or verbal commands to control components of a building in the event of a hazard.

BACKGROUND

Hazard detectors play a significant role in buildings in that they issue alerts in the event of fire, in the event of toxic gases or in the event of other hazards. Such hazard detectors are used in buildings, for example in industrial buildings, in office blocks and/or in residential buildings. Hazard detectors are widely used in the form of fire detectors, for example as optical and/or photoelectric smoke detectors and/or as ionization smoke detectors.

In a hazardous situation, people in a building frequently require information. This information can quite possibly be vital for survival. For example, a visitor in a burning factory may wish to have information regarding the available escape routes. Furthermore, parents in a burning residential building, may wish to know the whereabouts of their children in the building.

European patent application EP3147879A1 discloses a fire detection system. The system comprises at least one sensor (20-1, 20-2, 20-3) for detecting indications of fire and generating an alarm. The system also provides at least one override panel (50-1, 50-2). Finally, a monitoring system (120) issues a fire alarm in response to the signals from the sensors (20-1, 20-2, 20-3) and also in dependence on commands from the override panels (50-1, 50-2). In paragraph 36, patent application EP3147879A1 teaches, for example, that the override panel (50-1) in the kitchen can be controlled by speech recognition. Additionally, in accordance with paragraph 54, a local alarm can be acknowledged verbally by using a speech recognition system.

Patent application WO2005050953A2 describes an audio unit 10 in a housing 18. The audio unit 10 includes a speaker 12 and a microphone 14. It also comprises a thermal sensor 20. It is connected to a monitoring system by an interface 16. It is provided with audio signals recorded by microphones 14, which indicate the presence of people or the existence of certain ambient conditions.

SUMMARY

The teachings of the present disclosure describe an improved provision of information in the event of a hazard. In particular, in the event of a fire, speech recognition and speech processing provide relevant information with regard to evacuation. For example, some embodiments include a hazard detector (1), the hazard detector (1) comprising: at least one microphone (2) configured to record an audio signal; at least one hazard sensor (3); a detection circuit (4) in communicative connection with the at least one hazard sensor (3); and a processing unit (5) in communicative connection with the detection circuit (4) and with the at least one microphone (2). The detection circuit (4) is configured to receive sensor signals from the at least one hazard sensor (3) and to generate as a function of the sensor signals a detector signal which contains a positive or negative indication with respect to a hazard. The processing unit (5) comprises a digital interface (6) for communication with an external computer (7) and is configured: to receive the detector signal of the detection circuit (4); to receive the audio signal from the at least one microphone (2) and to detect a predetermined preamble comprising at least one word in the audio signal; and, if the detector signal contains a positive indication with respect to a hazard and/or if a predetermined preamble is detected in the audio signal, to generate a digital output signal as a function of the received audio signal; and to send the digital output signal to an external computer (7) via the digital interface (6).

In some embodiments, the hazard detector (1) is configured to send the digital output signal to an external computer (7) on the basis of a prespecified communications protocol.

In some embodiments, the detection circuit (4) is configured to send the detector signal to the processing unit (5).

In some embodiments, the processing unit (5) is communicatively connected to the detection circuit (4) by means of a communications bus.

In some embodiments, the processing unit (5) is configured to generate a digital output signal as a function of the received audio signal using lossy compression of the received audio signal.

In some embodiments, the hazard detector (1) additionally comprises at least one speaker (8), wherein the processing unit (5) is in communicative connection with the at least one speaker (8) and is also configured: to receive a digital input signal from the external computer (7) via the digital interface (6); to generate a speaker signal as a function of the digital input signal received from the external computer (7); to send the speaker signal to the at least one speaker (8); and wherein the at least one speaker (8) is configured to output the audio output signal generated by the processing unit (5).

In some embodiments, the hazard detector (1) additionally comprises at least one local peripheral interface (9), wherein the processing unit (5) is in communicative connection with the at least one local peripheral interface (9) and is also configured: to receive a digital input signal from the external computer (7) via the digital interface (6); to generate a trigger signal as a function of the digital input signal received from the external computer (7); to send the trigger signal to the at least one local peripheral interface (9); and wherein the at least one local peripheral interface (9) is configured to output the trigger signal generated by the processing unit (5) to a local peripheral device.

In some embodiments, the processing unit (5) additionally comprises a non-volatile memory in which an identifier is stored, wherein the position of the hazard detector (1) in a building can be determined from the stored identifier, wherein the processing unit (5) is also configured if the detector signal contains a positive indication with respect to a hazard: to send the stored identifier to the external computer (7) via the digital interface (6).

In some embodiments, the processing unit (5) additionally comprises a non-volatile memory in which an identifier and a building model are stored, and wherein the processing unit (5) is also configured if the detector signal contains a positive indication with respect to a hazard: to determine a position of the hazard detector (1) using the stored building model and the stored identifier; and to send the position determined to the external computer (7) via the digital interface (6).

In some embodiments, the digital interface (6) is a wireless interface and is configured to communicate with the external computer (7) using phase shift keying and/or quadrature phase shift keying; and wherein the processing unit (5) is also configured if the detector signal contains a positive indication with respect to a hazard and/or if a predefined preamble is detected in the audio signal, to send the digital output signal to an external computer (7) via the digital interface (6) using phase shift keying and/or quadrature phase shift keying.

BRIEF DESCRIPTION OF THE DRAWINGS

Various details will become apparent to the person skilled in the art from the following detailed description. Herein, the individual embodiments described are not restrictive of the scope of the teachings. The drawings attached to the description are described in the following.

DETAILED DESCRIPTION

Figure 1:
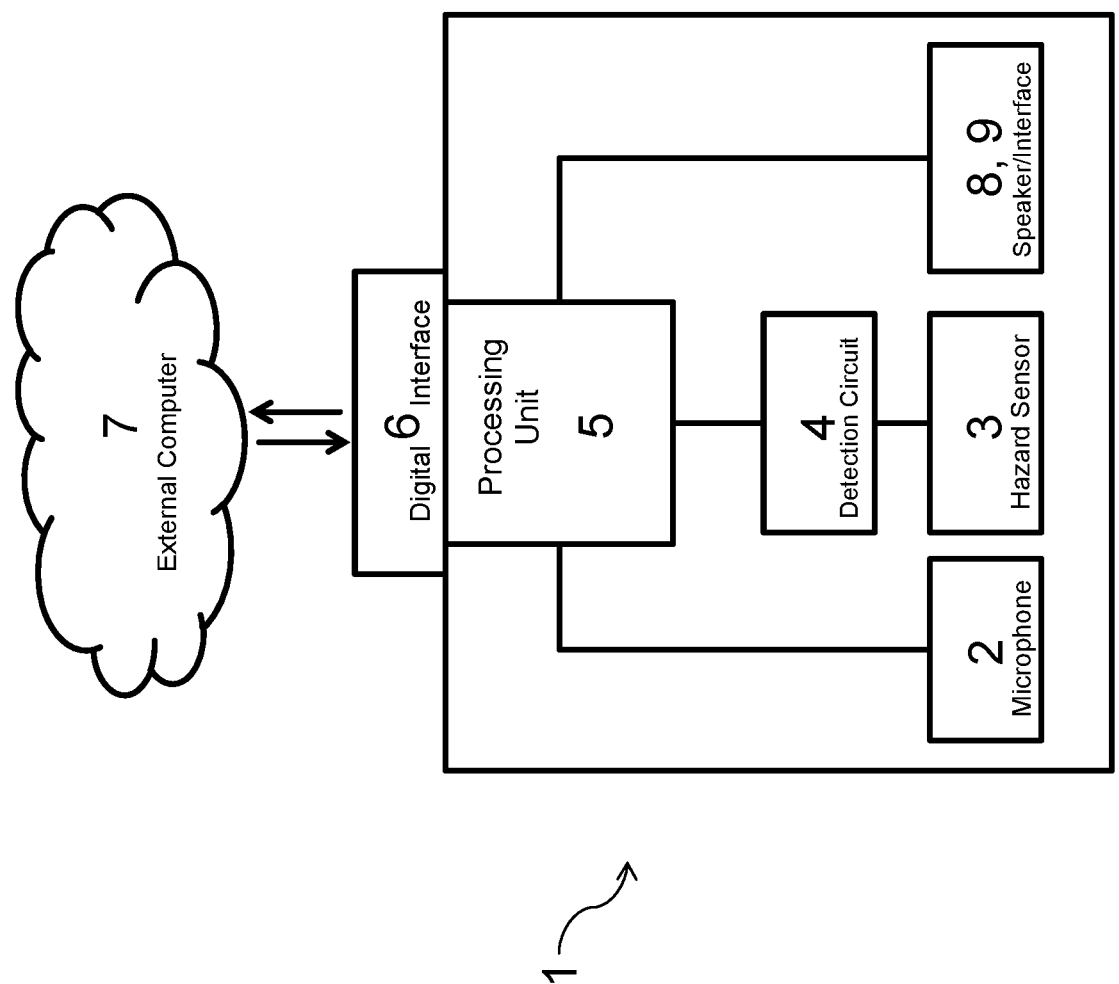
FIG. 1 is a schematic depiction of a hazard detection system incorporating teachings of the present disclosure.

The present disclosure describes a hazard detector and/or an interactive hazard detection system in a building. In some embodiments, the hazard detection system comprises at least one hazard sensor such as, for example, a fire alarm sensor or a gas alarm sensor. For interaction, the hazard detection system comprises at least one microphone and at least one output stage such as, for example, a speaker. The at least one microphone records audio signals. A speech recognition system recognizes speech, in particular words and/or word combinations and/or phrases in the audio signals coming from the microphone. Possible examples of recognized words and/or word combinations and/or phrases are "How do I get out?" or "Open the door!". An evaluation unit reads input from the speech recognition system and from the at least one hazard sensor. Thus, the evaluation unit detects whether a hazard exists, such as, for example, a fire or a gas alarm.

The hazard detector may determine on the basis of a signal from a hazard sensor whether a hazardous situation exists. If a hazardous situation does not exist, words and/or word combinations and/or phrases from the speech recognition system are only forwarded to the evaluation unit if a preamble is present. An example of a preamble is, for example "OK detector". If a hazardous situation does exist, words and/or word combinations and/or phrases are forwarded to the evaluation unit regardless of the presence of a preamble.

In some embodiments, there is an evaluation unit spatially separate from the at least one microphone and the at least one hazard sensor. For example, the at least one hazard sensor and the at least one microphone can be arranged on a hazard detector in a room of a building. The evaluation unit, which is, for example, a computer center, is spatially separate from the hazard detector. The evaluation unit and the hazard detector are communicatively connected by a data connection. The connection may be bidirectional. The hazard detector and evaluation unit may communicate using a predefined communications bus protocol.

In some embodiments, the evaluation unit additionally generates a response and/or a command as a function of building data. For example, the evaluation unit may feature a stored model of the building. The stored model and sensor data are used, for example, to calculate escape routes.

In some embodiments, a plurality of hazard detectors each with at least one hazard sensor are installed simultaneously in a building. Each of these hazard detectors is communicatively connected to the evaluation unit. The evaluation unit now generates responses and/or commands based on the signals from the different hazard detection sensors and preferably generates possible escape routes using stored building models.

In some embodiments, the system generates a response as a function of the inputs from the speech recognition system and at the same time as a function of the signals from the at least one hazard sensor. The response is forwarded to a speech synthesis unit. From the response, the speech synthesis unit generates a signal, which can optionally be output using an amplifier via the at least one speaker. In some embodiments, the evaluation unit generates a command, for example a command to open an automatically opening door. The command is transmitted to the automatically opening door via an output unit. Finally, the door executes the command coming from the output unit and opens.

The fire detection system shown in FIG. 1 comprises a hazard detector 1, in particular a fire detector. The hazard detector 1 is communicatively connected to an external computer 7, in particular to an external data processing system. The external computer 7 has a different location from that of the hazard detector 1. The external computer 7 may be a computer center. In some embodiments, the external computer 7 is a building management system.

In some embodiments, the hazard detector 1 communicates with the computer 7 on the basis of a specified communications protocol, in particular on the basis of a specified communications bus protocol. In some embodiments, the specified communications protocol and/or the specified communications bus protocol is a connectionless protocol. In particular, the hazard detector 1 and the computer 7 may communicate with one another on the basis of a TCP/IP or UDP protocol.

In some embodiments, the connection between the hazard detector 1 and the computer 7 is an encrypted data connection. In some embodiments, keys for the encrypted data connection are generated on the basis of a Diffie-Hellman algorithm, particularly preferably on the basis of a Diffie-Hellman algorithm based on elliptic curves. Encryption based on Diffie-Hellman, in particular based on Diffie-Hellman based on elliptic curves provides the advantage of encryption that is secure against a man-in-the middle attack or a Janus attack.

The hazard detector 1 further comprises an interface 6. The hazard detector communicates with the computer 7 in the manner described above via the interface 6. In some embodiments, the interface 6 is completely or partially integrated in a processing unit 5 of the hazard detector 1. For example, the interface 6 can be completely or partially integrated in a processor or a microprocessor or in a microcontroller. The completely or partially integrated interface 6 enables a compact design.

The hazard detector 1 further comprises at least one microphone 2. The microphone 2 is communicatively connected to the processing unit 5. The microphone 2 and the processing unit 5 may be communicatively connected by means of an analog-digital converter. In some embodiments, the analog-digital converter is an integrated part of the processing unit 5. The integrated analog-digital converter enables a compact design.

In some embodiments, the microphone 2 is simultaneously a speaker. In this embodiment, the hazard detector comprises a combined unit, which comprises a microphone 2 and a speaker 2. A combined unit comprises a microphone 2 and a speaker enables a compact and/or inexpensive design. A combined unit comprising a microphone 2 and a speaker reduces the number of components and thus contributes to a less error-prone design.

For the hazard detection the hazard detector 1 comprises at least one hazard sensor 3. The hazard sensor 3 may be a fire sensor, in particular a fire sensor based on or exclusively based on an optical measuring principle and/or based on or exclusively based on an ionization measuring principle. The hazard sensor 3 is in communicative connection with the processing unit 5.

In the example shown in FIG. 1, the hazard sensor 3 is communicatively connected to the processing unit 5 by means of a detection circuit 4. The detection circuit 4 reads signals from the hazard sensor 3, processes them to form a measured value and forwards the measured value to the processing unit 5. The measured value can, for example, be a binary signal, wherein a value of 0 indicates that there is no hazard and a value of 1 indicates that there is a hazard. It is envisaged that the detection circuit 4 reads the hazard sensor 3 at regular intervals, for example once every millisecond, every two milliseconds, every five milliseconds, once a second, twice a second, five times a second, every two seconds, and so on. In some embodiments, the detection circuit 4 only sends a signal to the processing unit 5 if there is a hazard. In other words, the detection circuit 4 may only send hazard signals, i.e. according to the above example a value of 1, to the processing unit 5. In some embodiments, the detection circuit 4 sends hazard signals to the processing unit 5 as often as the detection circuit 4 reads the hazard sensor 3. In some embodiments, the detection circuit 4 is an integrated part of the processing unit 5. A completely or partially integrated detection circuit 4 enables a compact design.

In some embodiments, the hazard detector comprises an output stage 8, 9. The output stage can, for example, be a speaker 8 or a peripheral interface 9. A peripheral interface 9 can, for example, be a digital or analog interface for opening a door or triggering an extinguishing system. The output stage 8, 9 is communicatively connected to the processing unit 5.

Figure 2:
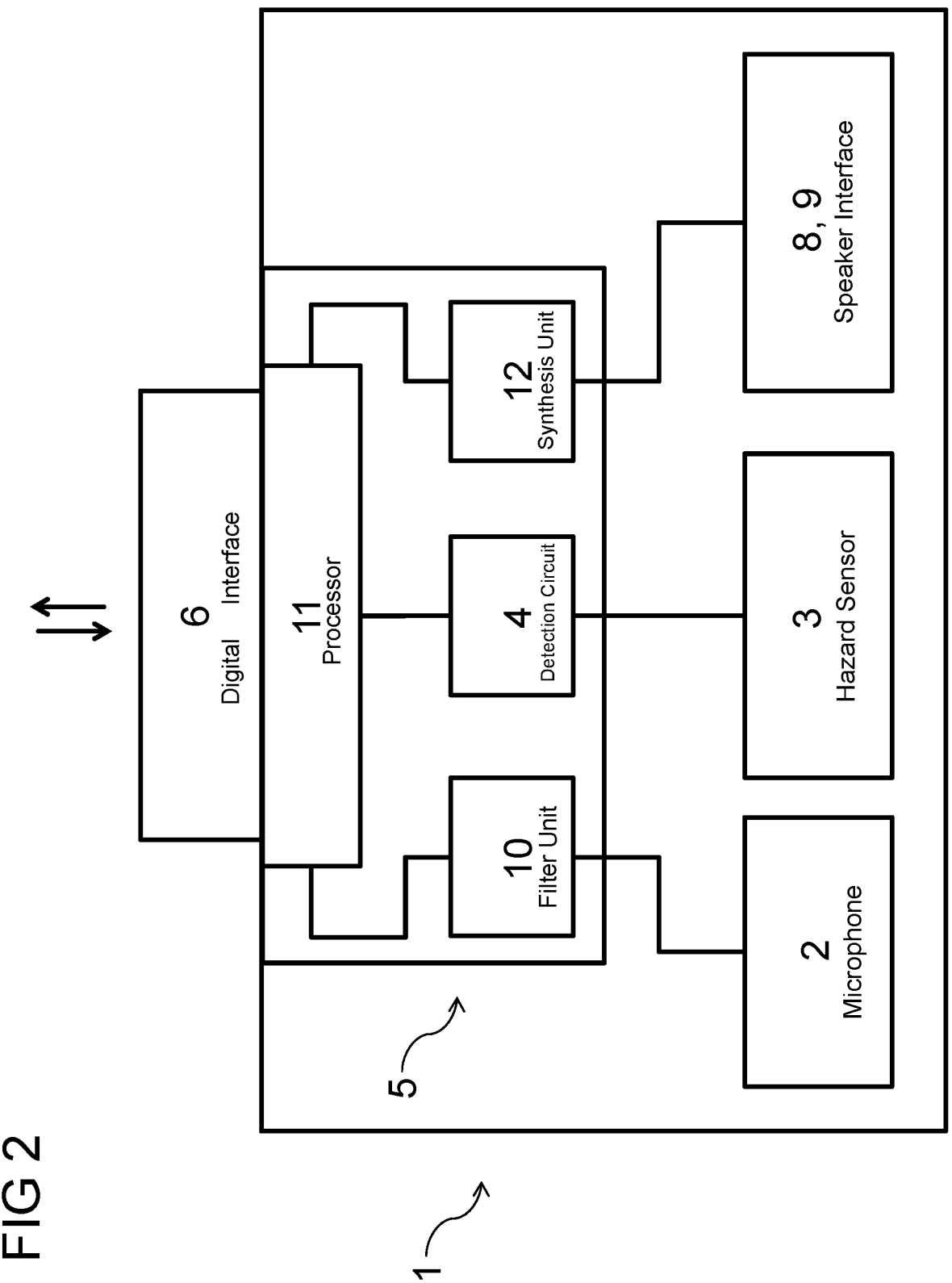
FIG. 2 is a schematic depiction of a hazard detector for a hazard detection system incorporating teachings of the present disclosure.

FIG. 2 shows further details of a hazard detector 1 incorporating teachings of the present disclosure. For example, FIG. 2 illustrates how the microphone 2 is coupled to the processing unit 5 by means of a unit 10. The unit 10 may comprise an activatable filter unit 10. In its activated state, the filter unit 10 evaluates signals coming from the microphone 2 for the presence of a specified preamble such as, for example, "OK detector". To this end, the filter unit 10 is embodied for speech recognition. Only when a specified preamble consisting of one or more words is present are signals originating from the microphone 2 (and processed) forwarded to the processing unit 5. In its deactivated state, the filter unit 10 forwards signals originating from the microphone 2 (and processed) regardless of the presence of a specified preamble to the processing unit 5.

In some embodiments, the filter unit 10 may be communicatively connected to a processor 11. The processor 11 can, for example, be a microprocessor or a microcontroller. The filter unit 10 can then be activated or deactivated by means of the processor 11. If a specified preamble consisting of one or more words is present and the filter unit 10 is active, signals originating from the microphone 2 (and processed) are forward to the processor 11. In deactivated state, the filter unit 10 forwards signals originating from the microphone 2 (and processed) regardless of the presence of a specified preamble to the processor 11. In some embodiments, the filter unit 10 is an integrated part of the processing unit 5. The integrated filter unit 10 enables a compact design.

FIG. 2 further shows a synthesis unit 12. The synthesis unit 12 is communicatively connected to the processor 11. It is furthermore communicatively connected to the output stage 8, 9. In particular, the synthesis unit 12 can be connected to the at least one speaker 8. In some embodiments, the synthesis unit 12 may comprise a speech synthesis unit. As such, it receives messages with single or multiple words or phrases such as, for example, "Good morning" from the processor 11. The speech synthesis unit 12 processes the received messages to form an audio signal, which can be output (possibly amplified) via the speaker 8. Finally, the synthesis unit 12 sends the processed received messages in the form of an audio signal to the speaker 8 or to an amplifier upstream of the speaker 8. In some embodiments, the synthesis unit 12 is an integrated part of the processing unit 5. The integrated synthesis unit 12 enables a compact design.

In some embodiments, a hazard detector 1 comprises: at least one microphone 2 configured to record an audio signal or plurality of audio signals; at least one hazard sensor 3; a detection circuit 4 in communicative connection with the at least one hazard sensor 3; a processing unit 5 in communicative connection with the detection circuit 4 and with the at least one microphone 2; wherein the detection circuit 4 is configured to receive sensor signals from the at least one hazard sensor 3 and, as a function of the sensor signals, to generate a detector signal, which contains a positive or negative indication with respect to a hazard; and the processing unit 5 comprises a digital interface 6 for communication with an external computer 7 and is configured: to receive the detector signal of the detection circuit 4; to receive the audio signal or audio signals from the at least one microphone 2 and to detect a predefined preamble comprising at least one word in the audio signal or in the audio signals; and, if the detector signal contains a positive indication with respect to a hazard and/or if a predefined preamble is detected in the audio signal or in the audio signals, to generate a digital output signal as a function of the received audio signal or received audio signals; and to forward and/or to send the digital output signal to an external computer 7 via the digital interface 6.

In some embodiments, the hazard detector 1 comprises a fire detector or a detector for earthquakes or a detector to be used in the case of natural catastrophes.

In some embodiments, the hazard sensor 3 comprises a fire sensor, for example a fire sensor for the optical detection of fires or a fire sensor based on the ionization principle. The detection circuit can in particular be configured to receive sensor signals from the at least one fire sensor 3 and to generate as a function of the sensor signals a detector signal which contains a positive or negative indication with respect to a fire.

In some embodiments, the predefined preamble comprises at least one predefined word or a predefined group of words such as, for example, "OK detector". The predefined preamble can, for example, be stored in a non-volatile memory of the processing unit 5. The processing unit 5 is configured to read the predefined preamble from the non-volatile memory.

In some embodiments, the hazard detector 1 is configured to forward and/or to send the digital output signal to an external computer on the basis of a predefined communications protocol. The predefined communications protocol can, for example, be a connectionless communications protocol. The predefined communications protocol can furthermore be a predefined communications bus protocol.

In some embodiments, the connection between the hazard detector 1 and the external computer 7 is configured for bidirectional data exchange. In particular, the connection between the hazard detector 1 and the external computer 7 can be configured for bidirectional and encrypted data exchange.

In some embodiments, the detection circuit 4 is configured to send the detector signal to the processing unit 5; 11. In some embodiments, the detection circuit 4 is configured to send the detector signal to the processing unit 5; 11 by means of an at least unidirectional data connection. In particular the use of a predefined communications bus protocol between the detection circuit 4 and the processing unit 5; 11 is possible.

In some embodiments, the processing unit 5 is in communicative connection with the detection circuit 4 by means of a communications bus. In some embodiments, the detection circuit 4 and the processing unit 5; 11 are communicatively connected by means of a bidirectional or unidirectional communications bus. It is also possible for other units, such as, for example, the microphone 2, to be connected to the communications bus.

In some embodiments, the processing unit 5 is a microcontroller with an integrated analog-digital converter or a microprocessor with integrated analog-digital converter. The integrated analog-digital converter enables a compact design. The analog-digital converter of the processing unit 5 is in communicative connection with the at least one microphone 2.

In some embodiments, the processing unit 5 is configured to generate a digital output signal as a function of the received audio signal or the received audio signals using (lossy) compression of the received audio signal or the received audio signals.

In some embodiments, the hazard detector 1 comprises the processor 5; 10; 11, an application-specific integrated circuit and/or a field programmable (logic) gate array for (lossy) compression of the received audio data. The application-specific integrated circuit and/or field programmable (logic) gate array is preferably an integrated part of the processor 5; 10; 11. The integrated application-specific integrated circuit and/or field programmable (logic) gate array enables a compact design.

In some embodiments, the hazard detector 1 additionally comprises at least one speaker 8, wherein the processing unit 5 is in communicative connection with the at least one speaker 8 and is also configured: to receive a digital input signal from the external computer 7 via the digital interface 6; to generate a speaker signal as a function, preferably a direct function, of the digital input signal received from the external computer 7; to send the speaker signal to the at least one speaker 8; and wherein the at least one speaker 8 is configured to output the audio output signal generated by the processing unit 5.

A direct function is dependent upon no other arguments than those specified. If necessary, function parameters can be included in the determination of the function.

In some embodiments, the at least one speaker 8 and the processing unit 5; 11 are communicatively connected by means of a bidirectional or unidirectional communications bus. It is also possible for other units, such as, for example, the microphone 2 and/or the detection circuit 4 to be connected to the communications bus.

In some embodiments, the processing unit 5 is a microcontroller or microprocessor with an integrated digital-analog converter. The integrated digital-analog converter enables a compact design. The digital-analog converter of the processing unit 5 is (possibly via an intermediate amplifier) in communicative connection with the at least one speaker 8.

In some embodiments, the processing unit 5 comprises a speech synthesis unit 12. The speech synthesis unit 12 is (possibly, via an intermediate amplifier) in communicative connection with the at least one speaker 8. In some embodiments, the speech synthesis unit 12 is in communicative connection with the at least one speaker 8 by means of a digital-analog converter (and an amplifier).

In some embodiments, the hazard detector 1 additionally comprises an amplifier circuit. Herein, the processing unit 5 is in communicative connection with the at least one speaker 8 by means of a digital-analog converter and by means of the amplifier circuit. The processing unit 5 generates a digital speaker signal as a function, e.g. a direct function, of the digital input signal received from the external computer 7 and sends the digital speaker signal to the digital-analog converter. The digital-analog converter converts the digital speaker signal into an analog speaker signal and sends the analog speaker signal to the amplifier circuit. The amplifier circuit amplifies the analog speaker signal and sends the amplified analog speaker signal to the at least one speaker 8. In some embodiments, the amplifier circuit comprises an operational amplifier and/or a transistor.

In some embodiments, the hazard detector 1 additionally comprises at least one local peripheral interface 9, wherein the processing unit 5 is in communicative connection with the at least one local peripheral interface 9 and is also configured: to receive a digital input signal from the external computer 7 via the digital interface 6; to generate a trigger signal as a function, preferably a direct function, of the digital input signal received from the external computer 7; to send the trigger signal to the at least one local peripheral interface 9; and wherein the at least one local peripheral interface 9 is configured to output the trigger signal generated by the processing unit 5 to a local peripheral device. The local peripheral device can, for example, be a controllable door and/or a controllable window. The local peripheral device can also be a controllable fire extinguishing system.

The at least one local peripheral interface 9 can be a digital interface. As such it communicates with the peripheral device on the basis of a digital communications protocol and/or on the basis of a digital communications bus protocol. In some embodiments, the at least one local peripheral interface 9 is an analog interface.

In some embodiments, the hazard detector 1 additionally comprises an amplifier circuit. In some embodiments, the processing unit 5 of the hazard detector 1 is in communicative connection with the at least one local peripheral interface 9. To this end, the processing unit 5 generates an advance signal as a function, e.g. a direct function, of the digital input signal received from the external computer 7 and sends the advance signal to the amplifier circuit. The amplifier circuit amplifies the advance signal to form a trigger signal and sends the trigger signal to the at least one local peripheral interface 9. In some embodiments, the amplifier circuit comprises an operational amplifier and/or a transistor.

In some embodiments, the processing unit 5 additionally comprises a non-volatile memory in which an identifier is stored, wherein the position of the hazard detector 1 in a building can be determined from the stored identifier, wherein the processing unit 5 is also configured if the detector signal contains a positive indication with respect to a hazard: to forward and/or to send the stored identifier to the external computer 7 via the digital interface 6.

The building can, for example, be an industrial building, a residential building and/or a factory. This list is by no means exhaustive.

In some embodiments, the stored identifier is an address of the digital interface 6. In particular, the stored identifier is an address such as, for example, a machine address of the digital interface 6 serving as a unique identifier of the digital interface 6 and/or the hazard detector 1 in a computer network. The position of the hazard detector 1 in a building is determined from this address by means of a table. Herein, the table shows identifiers for positions of the hazard detector in a building. The table for determining the position can, for example, be stored on the external computer 7, in particular in a non-volatile memory of the external computer 7, and/or on the hazard detector 1, for example in a non-volatile memory of the processing unit 5.

In some embodiments, the identifier contains coordinates, which are used to determine the position of the hazard detector 1 in a building. For example, the coordinates can be degrees in longitude and latitude. In particular, the processing unit 5 comprises a unit for satellite-assisted location and/or for location using radio waves by triangulation. The processing unit 5 equipped in this way ascertains the position in the form of coordinates of the hazard detector 1 using the locating unit and writes the position ascertained into the non-volatile memory of the processing unit 5.

In some embodiments, the processing unit 5 additionally comprises a non-volatile memory in which an identifier and a building model are stored, and wherein the processing unit 5 is also configured if the detector signal contains a positive indication with respect to a hazard: to determine a position of the hazard detector 1 using the stored building model and the stored identifier; and to forward and/or to send the position determined to the external computer 7 via the digital interface 6.

In some embodiments, the building model is a building data model. In particular, the building model can be a building data model according to one or more of the following standards or documents:

United States National Building Information Modeling Standard, published Dec. 18, 2007 in Version 2,
United States National Building Information Modeling Standard, published 2015 in Version 3,
BIM Guideline for Germany, File Reference 10.08.17.7-12.08, published 2013,
British Standard 8536-2:2016,
ÖNORM A 6241-2:2015.

In some embodiments, based on the transmitted position and based on the building model, the external computer 7 uses a suitable algorithm to find an optimal escape route from the building. For example, an optimal escape route can be determined and/or calculated on the basis of an algorithm for solving the messenger problem.

In some embodiments, the digital interface 6 is a wireless interface and is configured to communicate with the external computer 7 using phase shift keying and/or quadrature phase shift keying; and wherein the processing unit 5 is also configured if the detector signal contains a positive indication with respect to a hazard and/or if a predefined preamble is detected in the audio signal, to forward and/or to send the digital output signal to an external computer 7 via the digital interface 6 using phase shift keying and/or quadrature phase shift keying.

In some embodiments, communication with the external computer 7 takes place using a suitable (digital and/or connectionless) communications bus protocol and/or a suitable (bidirectional) communications bus. It is in particular provided that a communications bus protocol and/or a communications bus is used for the wireless transmission of information. In the case of the wireless transmission of information, it should be noted that, in the event of a hazard, wire-based communication is frequently impossible and the transmission of radio waves is disrupted. Accordingly, robust methods are used for wireless data transmission. In some embodiments, the digital interface 6 of the hazard detector 1 transmits wirelessly using a special modulation method such as phase shift keying and/or quadrature phase shift keying. Furthermore, the reliability of the wireless data transmission can be improved by increasing the redundancy of the data to be transmitted. For example, a message to be transmitted (via the bus) can be composed of up to 2000 individual transmissions. Such improvements enable the robustness and/or range of the wireless data transmission to be optimized. Further improvements in this respect relate to the choice of a suitable channel width (180 kHz) in conjunction with a suitable frequency band (preferably about 800 MHz, for example 868 MHz).

Parts of an apparatus or a method according to the present disclosure can be embodied as hardware, as a software module, which is executed by a computing unit, or on the basis of a cloud computer, or using a combination of the above-named options. The software can comprise firmware, a hardware driver, which is executed within an operating system, or an application program. Therefore, the present disclosure also relates to a computer program product containing the features of this disclosure or executes the necessary steps. When implemented as software, the functions described can be stored as one or more commands on a computer-readable medium. Some examples of computer-readable media include random access memory (RAM), magnetic random-access memory (MRAM), read-only memory (ROM), flash memory, electronically programmable ROM (EPROM), electronically programmable and erasable ROM (EEPROM), registers of a computing unit, a hard disk, a removable storage unit, an optical memory or any suitable medium which can be accessed by a computer or by other IT apparatuses and applications.

The description relates to individual embodiments of the disclosure. Various modifications can be made to the embodiments without deviating from the underlying idea and without departing from the scope of this disclosure. The subject matter of the present disclosure is defined by its claims. A wide variety of modifications are possible without departing from the scope of protection of the following claims.

REFERENCE CHARACTERS

1 Hazard detector
2 Microphone
3 Hazard sensor
4 Detection circuit
5 Processing unit 6 Interface
7 External computer
8 Speaker
9 Peripheral interface
10 Filter unit
11 Processor
12 Synthesis unit

The invention claimed is:

1. A hazard detector comprising:
a microphone configured to record an audio signal installed in a permanent location in a building;
a hazard sensor comprising at least one of a fire sensor or a gas sensor installed in permanent location in a building;
a detection circuit in communicative connection with the hazard sensor; and
a processing unit in communicative connection with the detection circuit and with the microphone;
wherein the detection circuit receives sensor signals from the hazard sensor and generates a detector signal as a function of the sensor signals, the detector signal representing a positive or negative indication with respect to a hazard; and
the processing unit comprises a digital interface for communication with an external computer and is configured:
to receive the detector signal from the detection circuit;
to receive the audio signal from the microphone and to detect a predetermined preamble comprising a word in the audio signal; and
if the detector signal contains a positive indication with respect to a hazard and a predetermined preamble is detected in the audio signal, to generate a digital output signal as a function of the received audio signal and send the digital output signal to the external computer via the digital interface;
wherein the digital output signal includes an identifier for the permanent location in the building.

2. The hazard detector as claimed in claim 1, wherein the hazard detector sends the digital output signal to the external computer on the basis of a prespecified communications protocol.

3. The hazard detector as claimed in claim 1, wherein the detection circuit sends the detector signal to the processing unit.

4. The hazard detector as claimed in claim 1, wherein the processing unit is communicatively connected to the detection circuit by a communications bus.

5. The hazard detector as claimed in claim 1, wherein the processing unit generates a digital output signal as a function of the received audio signal using lossy compression of the received audio signal.

6. The hazard detector as claimed in claim 1, further comprising a speaker;
wherein the processing unit is in communicative connection with the speaker and is also configured:
to receive a digital input signal from the external computer via the digital interface;
to generate a speaker signal as a function of the digital input signal received from the external computer;
to send the speaker signal to the speaker; and
wherein the speaker emits the audio output signal generated by the processing unit.

7. The hazard detector as claimed in claim 1, further comprising a peripheral interface;
wherein the processing unit is in communicative connection with the local peripheral interface and is also configured:
to receive a digital input signal from the external computer via the digital interface;
to generate a trigger signal as a function of the digital input signal received from the external computer;
to send the trigger signal to the local peripheral interface; and
wherein the local peripheral interface is configured to output the trigger signal generated by the processing unit to a local peripheral device.

8. The hazard detector as claimed in claim 1, wherein the processing unit further comprises a non-volatile memory storing the identifier;
wherein the position of the hazard detector in a building correlates to the stored identifier.

9. The hazard detector as claimed in claim 1, wherein the processing unit further comprises a non-volatile memory storing the identifier and a building model; and
wherein the processing unit is also configured, if the detector signal contains a positive indication with respect to a hazard, to determine a position of the hazard detector using the stored building model and the stored identifier and to send the position determined to the external computer via the digital interface.

10. The hazard detector as claimed in claim 1, wherein the digital interface comprises a wireless interface configured to communicate with the external computer using phase shift keying and/or quadrature phase shift keying; and
wherein the processing unit is also configured, if the detector signal contains a positive indication with respect to a hazard and/or if a predefined preamble is detected in the audio signal, to send the digital output signal to the external computer via the digital interface using phase shift keying and/or quadrature phase shift keying.

* * * * *